United States Patent
Govoni

(10) Patent No.: US 8,152,636 B2
(45) Date of Patent: Apr. 10, 2012

(54) PARTY KITS WITH CHARACTERS MATCHED TO VIRTUAL ANIMATION CHARACTERS

(75) Inventor: Emanuele Govoni, Bologna (IT)

(73) Assignee: Qubicaamf Europe S.p.A., Bologna (IT)

( * ) Notice: Subject to any disclaimer, the term of this patent is extended or adjusted under 35 U.S.C. 154(b) by 1238 days.

(21) Appl. No.: 11/857,897

(22) Filed: Sep. 19, 2007

(65) Prior Publication Data

US 2008/0076554 A1 Mar. 27, 2008

Related U.S. Application Data

(60) Provisional application No. 60/846,086, filed on Sep. 21, 2006.

(51) Int. Cl.
*A63F 9/24* (2006.01)
(52) U.S. Cl. .......................................... 463/31
(58) Field of Classification Search .................. None
See application file for complete search history.

(56) References Cited

U.S. PATENT DOCUMENTS

| | | | | |
|---|---|---|---|---|
| 2005/0014570 A1* | 1/2005 | Blackstone | ...................... | 473/58 |
| 2005/0225729 A1* | 10/2005 | Kobayashi | ....................... | 353/30 |
| 2007/0070444 A1* | 3/2007 | Sakakibara et al. | ........... | 358/474 |
| 2008/0027777 A1* | 1/2008 | Kimiya | .............................. | 705/8 |
| 2010/0265184 A1* | 10/2010 | Jung | ............................... | 345/169 |
| 2011/0064672 A1* | 3/2011 | Hirsch | ........................... | 424/9.2 |
| 2011/0065395 A1* | 3/2011 | Yamamoto et al. | .............. | 455/74 |
| 2011/0282997 A1* | 11/2011 | Prince et al. | ................... | 709/226 |
| 2012/0022942 A1* | 1/2012 | Holloway et al. | ........... | 705/14.49 |

* cited by examiner

*Primary Examiner* — Pierre E Elisca
(74) *Attorney, Agent, or Firm* — Andrew M. Calderon; Roberts Mlotkowski Safran & Cole, P.C.

(57) ABSTRACT

Party kits are provided with are used in bowling environments, and more particularly to party kits having characters related to animated characters which are used in bowling environments including, for example, with automated bowling scoring systems. The party includes include party gifts having at least one character thereon related to one or more animated characters associated with a theme. The one or more animated characters are displayed on one or more systems in the bowling center. The kit also includes party supplies having the at least one character thereon which are related to the one or more animated characters displayed on the one or more systems in the bowling center.

48 Claims, 15 Drawing Sheets

PARTY KITS WITH CHARACTERS MATCHED TO VIRTUAL ANIMATION CHARACTERS

CROSS REFERENCE TO RELATED APPLICATIONS

This application claims priority under 35 U.S.C. §119 to U.S. Provisional Application Ser. No. 60/846,086, filed on Sep. 21, 2006, the contents of which are incorporated in their entirety herein, including the appendix thereto.

FIELD OF THE INVENTION

The invention relates to party kits used in bowling environments, and more particularly to party kits having characters related to animated characters which are used in bowling environments including, for example, with automated bowling scoring systems.

BACKGROUND OF THE INVENTION

Various types of party supplies and merchandising for birthday parties and the like are well known. For example, birthday party kits related to animated characters can be purchased at party supply stores, toy stores or other general merchandise stores. However, there is no known connection between the party supplies and the party venue. More particularly, there is no known connection between the party supplies and animations related to certain actions conducted at the venue.

Parties may be held at different places, including bowling centers. However, to date, such venues are not connected to any specific party supplies. For example, if a consumer purchases birthday party supplies at a party supply store, such items are not related to and bear no connection to the venue where the party is being held.

SUMMARY OF THE INVENTION

The invention meets needs and avoids the disadvantages and drawbacks of the known art by providing a party kit that is related to and connected to the bowling experience. In embodiments, the invention directly connects the bowling experience to the party experience by linking the party supplies to animated characters used in the bowling environment. In one embodiment, the animated characters can be linked to characters used in an automated bowling scoring system.

In the case of bowling centers, in particular, some bowling centers have animated characters associated with the automated bowling scoring system. Participants can select a particular theme (underwater, dinosaurs, etc.) or particular group of characters for the scoring system. Based on particular bowling scoring events, such as strikes or spares, the characters appear on the screen to offer congratulations to the participants.

According to one aspect of the invention, a party kit includes items having characters displayed on the automated bowling scoring system in a bowling center. In embodiments, the automated bowling scoring system includes a display for displaying one or more animated characters based on signals related to a score of the bowler, e.g., a spare, strike or gutter ball. As such, these one or more animated characters are related to the bowling actions such as, for example, a strike, a spare, a gutter ball and a split.

The party kit includes procedure materials, training materials, marketing, gift bags and party supplies. In embodiments, the gift bags and party supplies include animated characters associated with one of many different themes. These themes may be, for example, an ocean theme, a prehistoric theme or a fairy tale theme.

In a first aspect of the invention, a party kit is associated with a party theme of a bowling center. The party kit comprises party gifts having at least one character thereon related to one or more animated characters associated with a theme. The one or more animated characters are displayed on one or more systems in the bowling center. The party kit also includes party supplies having the at least one character thereon which are related to the one or more animated characters displayed on the one or more systems in the bowling center.

In further embodiments, the one or more systems is an automated bowling scoring system, which comprises: a pin detector; a processor configured to receive information from the pin detector related to bowling actions; and a display configured to display one or more of the animated characters based on signals from the processor. The actions of the one or more animated characters are related to the bowling actions.

The party gifts include at least one of crayons, coloring book, wristband, key chain, pencil and storage medium. The storage medium is a CD ROM. The party supplies or party gifts include a storage medium storing at least one of: a short animation clip that showcases different themes having the one or more animated characters, games, screen savers, screen buddies and a library of characters from the different themes. The storage medium includes a link to content, updates, and offers associated with the different themes having the one or more animated characters. The storage medium includes a link to an interactive display configured to view the different themes and register for a theme party, each having the one or more animated characters associated therewith.

The interactive display is a plurality of web pages including at least one of: a home page, a theme page, a party experience page, a party package page, an explanation page and a registration page. The theme page includes the different themes and animations thereof associated with the one or more animated characters displayed on the one or more system in the bowling center. The party experience page is configured to show the party gifts associated with the different themes. The party package page is configured to show a list of items included with the party kit. The list of items include at least one of: a parent survival guide; a table set-up; decorations; and a gift box holding the party gifts, all having the one or more characters associated with the animated characters displayed in the bowling center. The explanation page explains concepts behind the party kit using the one or more animated characters displayed in the bowling center. The registration page includes a name and email field for registering of users. The party supplies includes party decorations and tableware, each having the at least one character thereon.

The party kit further comprises marketing materials. The marketing materials include at least one of: promotional stand-ups; posters; monitor ads; brochures/flyers; bounce-back/informational coupons; and point of sale (POS) displays, which have the at least one character thereon. The marketing materials include a computer readable medium storing computer executable code for causing a computer to display advertisements related to theme parties. The marketing materials include a computer readable medium storing computer executable code for causing a computer to display demonstrations of actions of the one or more animated characters in combination with the at least one character.

The party kit further comprises procedure materials related to the party kit. The procedure materials include information related to at least one of: direct mail postcards; birthday club cards; posters; monitor ads for uploading into the one or more systems of the bowling center including at least one of kiosks, video displays, and scoring displays; brochures/flyers; buttons; bounceback/informational coupons; point of sale displays; promotional standees; e-mail templates; website marketing; merchandising materials; sample contracts; and reservation and confirmation processes.

The party kit further comprises an up-sale merchandising set including at least themed items based on the at least one animated character in an automated bowling scoring system of the bowling center. The party kit further comprises training materials. The training materials include information related to at least one of: a process of booking a party; party confirmation calls; upselling before and during the party; meet and greet information; pre-party set-up; how to use computer/scoring systems in a bowling environment; table set-up; food handling (if applicable); safety rules; wrap up/sample scripts; and clean up. The party kit further comprises at least one of: themed party invitations; a parent survival guide; tableware; standees; thank you cards; comment evaluation cards; themed party guide; and party host shirt.

In another aspect of the invention, a system for a themed part is provided. The system includes a party kit and an automated bowling scoring system in a bowling center. The automated bowling scoring system includes a pin detector, a processor for receiving information from the pin detector related to bowling actions, and a display for displaying one or more animated characters based on signals from the processor. The party kit comprises: marketing materials for marketing the party kit; party supplies related to the one or more animated characters displayed by the automated bowling scoring system; merchandising items related to the one or more animated characters displayed by the automated bowling scoring system; and gift bags or boxes including gifts for party attendees. Each of the gifts has one or more character related to the one or more animated characters displayed by the automated bowling scoring system.

The system further comprises: procedure materials related to contents of the party kit, to run themed parties and marketing of the party kit to attract customers; and training materials for training employees of the bowling center on use of the party kit and to run the themed parties. The gift bags or boxes include a computer readable medium storing computer executable code for causing a computer to display characters associated with the one or more animated characters displayed by the automated bowling scoring system. The gifts are at least one of crayons, coloring book, wristband, key chain, pencil and storage medium. The party supplies or gift bags or boxes include a storage medium storing at least one of: a short animation clip that showcases different themes having the one or more animated characters, games, screen savers, screen buddies and a library of characters from the different themes used by the automated bowling scoring system. The storage medium includes a link to content, updates, and offers associated with the different themes having the one or more animated characters. The party supplies or gift bags or boxes include a storage medium storing a link to an interactive display configured to view different themes and register for a theme party.

The interactive display is a plurality of web pages including at least one of: a home page, a theme page, a party experience page, a party package page, an explanation page and a registration page. The theme page includes different themes and animations thereof associated with the one or more animated characters displayed by the automated bowling scoring system. The party experience page shows the gifts associated with different themes used by the automated bowling scoring system. The party package page shows a list of items included with the party kit. The list of items include at least one of: a parent survival guide; a table set-up; decorations; and a gift box holding the party gifts, all having one or more characters associated with the animated characters displayed by the automated bowling scoring system. The explanation page explains concepts behind the party kit using the one or more animated characters displayed by the automated bowling scoring system. The registration page includes a name and email field for registering of users. The party supplies include party decorations and tableware, each having at least one character thereon associated with one or more animated characters. The marketing materials include at least one of: promotional stand-ups; posters; monitor ads; brochures/flyers; bounceback/informational coupons; and POS displays, which use at least one character also used by the automated bowling scoring system.

The procedure materials include information related to at least one of: direct mail postcards; birthday club cards; posters; monitor ads for uploading into the one or more systems of the bowling center including at least one of kiosks, video displays, and scoring displays; brochures/flyers; buttons; bounceback/informational coupons; point of sale displays; promotional standees; e-mail templates; website marketing; merchandising materials; sample contracts; and reservation and confirmation processes. The training materials include information related to at least one of: a process of booking a party; party confirmation calls; upselling before and during the party; meet and greet information; pre-party set-up; how to use computer/scoring systems in a bowling environment; table set-up; food handling (if applicable); safety rules; wrap up/sample scripts; and clean up.

The party kit further comprises at least one of: themed party invitations; a parent survival guide; tableware; standees; thank you cards; comment evaluation cards; themed party guide; and party host shirt. Each of the above items includes at least one character used by the automated bowling scoring system. The merchandising items including at least themed items based on at least one animated character used by the automated bowling scoring system.

A method of using a party kit including animated characters thereon, comprises: decorating a location of a bowling center used for a party with at least tableware and decorations each having one or more characters thereon which are displayed by an automated bowling scoring system when certain bowling actions occur; and providing gifts to party attendees, each of the gifts having the one or more characters thereon which are to be displayed by an automated bowling scoring system when certain bowling actions occur. The method further comprises selling merchandising materials having the one or more characters thereon which are to be displayed by an automated bowling scoring system when certain bowling actions occur. The party kit is a system for providing entertainment, the system comprising a display for displaying the one or more animated characters associated with the theme as a background of a scoring grid. The party kit and the associated automated bowling scoring system is an entertainment system, where the display displays the one or more animated characters as a background to a scoring grid.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
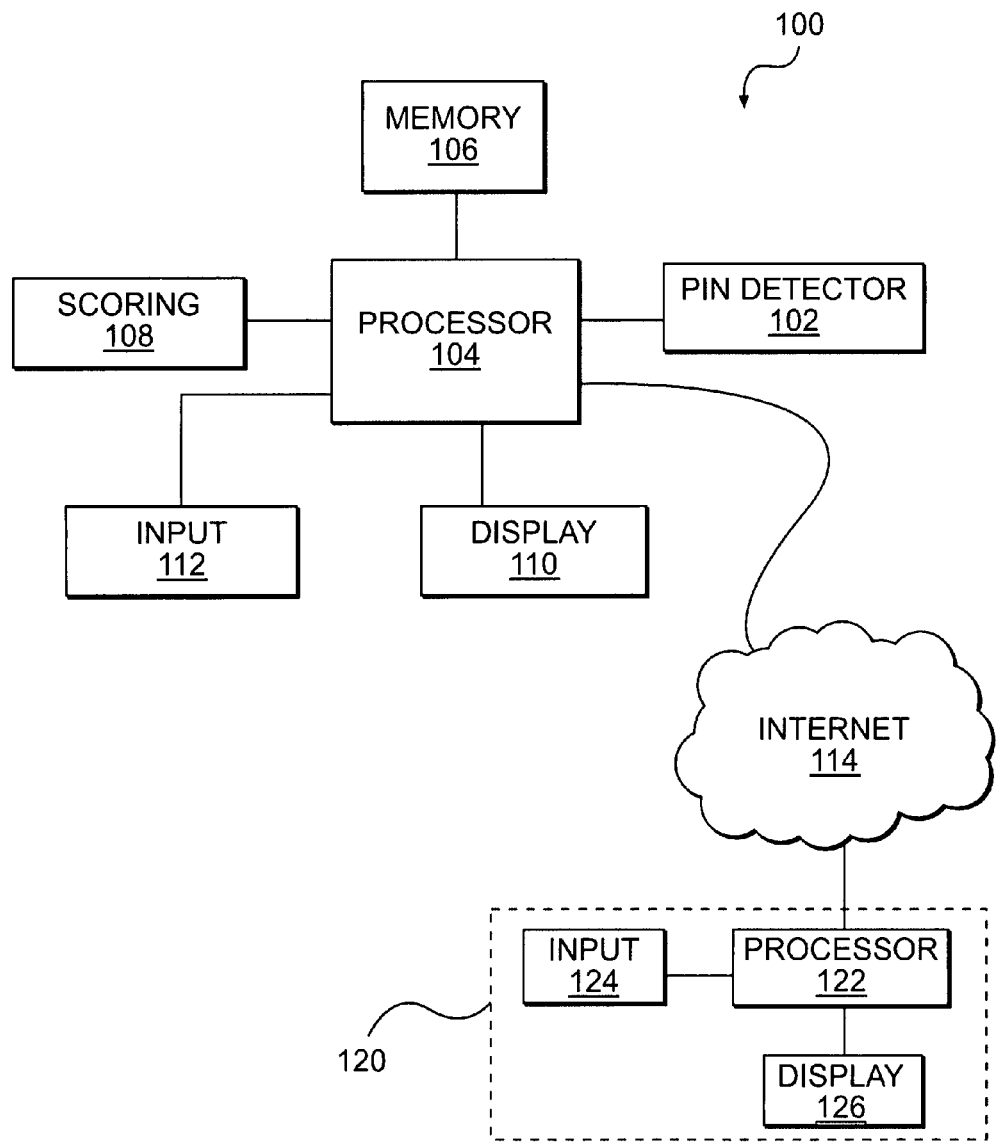
FIG. 1 is a schematic diagram illustrating an automated bowling scoring used with a party kit according to principles of the invention.

The present invention is directed to a themed environment such that party guests are completely surrounded by physical party supplies such as tableware, table supplies, cut-outs, balloons and other items described herein, in addition to the virtual presentation of animated characters displayed on a monitor such as, for example, a scoring monitor. The animated characters and the physical party supplies should preferably have the same theme, i.e., the same characters and environment in which the characters are acting. In this way, the party guests experience a full involvement in the themed party which presents an enjoyable environment and hence a power marketing tool for bowling centers.

The invention relates to party kits used in bowling environments, and more particularly to party kits, which use animated characters associated with bowling environments. For example, the party kits may include animated characters shown in an automated bowling scoring system in a bowling center. In embodiments, the party kits may be used for many different occasions. These occasions may include birthday parties or other parties, such as holidays (Halloween, St. Patrick's Day) or graduations. In embodiments, the invention takes the animated characters used in the bowling scoring system that are seen on the display monitors over the bowling lanes and uses these characters in themed party merchandising and gifts, bringing the virtual characters into physical reality.

In use, the party kits may be delivered as a "party in a box" kit. The kit may include procedure manuals, training manuals, an in-center marketing kit, theme party supplies and merchandising and gift bags that bring the environment from the bowling lane to the party and from the party home with each participant of the party. By way of examples, the procedure manual may include materials related to conducting a theme party in accordance with the invention. These materials would preferably be supplied to the proprietor or employees of the bowling center. The training materials include instructions for training employees of the bowling center to effectively use the party kit. The marketing materials include advertisements related to the party kit in order to attract customers. In one embodiment, the marketing materials may include advertisements in the form of promotional stand-ups, posters, monitor ads, brochures/flyers, bounceback/informational coupons, and point of sale (POS) displays.

The marketing materials may also include a computer readable medium (e.g., CD ROM) storing computer executable code for causing a computer to display advertisements related to theme parties in accordance with the invention. Examples of a computer-readable medium include magnetic tape, a removable computer diskette, a read-only memory (ROM), a rigid magnetic disk and an optical disk (CD-ROM).

More specifically, the computer readable medium would include demonstrations of the theme party, e.g., show the animated characters on the party supplies, gift contents and decoration in combination with the bowling experience. In embodiments, the computer readable medium may also include one or more links to a website related to the party kits. The website may include, for example, an explanation of the different available party themes, e.g., prehistoric, ocean and fairy tale, as well as an on-line registration form to reserve a date and party theme. The on-line registration form allows customers to remotely arrange a theme party at a bowling center or other venue.

The website may also include other useful information such as, for example, a display of the different gifts and different types of party supplies related to a particular theme party. The gifts may include, for example, crayons, coloring books, wristbands, key chains, pencils and pens to a host of other gifts, all having characters associated with the characters associated with the selected animated characters displayed in the bowling environment. The party supplies and decorations may include, for example, tablecloths, plates, cups, napkins, balloons, center pieces for tables, place mats, name tags to a host of other supplies, all having characters associated with selected animated characters displayed in the bowling environment.

The party supplies, as discussed above, relate to the animated characters displayed by the bowling center and more preferably on the automated bowling scoring system. The merchandising items, also discussed herein, can relate to the animated characters displayed by the bowling center and, more preferably, the automated bowling scoring system. The gift bags (or boxes) include gifts with the animated characters displayed by the automated bowling scoring system or generally displayed within the bowling environment. In embodiments, the gift bags include a computer readable medium storing computer executable code for causing a computer to display images associated with the animated characters displayed by the bowling scoring system, as well as games, instructional videos (e.g., bowling instructions) and other animations.

System Environment

FIG. 1 is a schematic diagram illustrating an automated bowling scoring system or other display system used with the party kit according to principles of the invention. The automated bowling scoring system shown in FIG. 1 may be representative of a Bowler Entertainment System® ("BES") manufactured and sold by QubicaAMF Products, LLC. It should be understood by those of skill in the art that the schematic of FIG. 1 is only representative of various possible equivalent-computing devices that may perform the processes described herein. To this extent, in embodiments, the functionality provided by the computing device can be implemented by a computing article of manufacture that includes any combination of general and/or specific purpose hardware and/or computer program code. In each embodiment, the program code and hardware can be created using standard programming and engineering techniques, respectively.

In embodiments, the automated bowling scoring system may have various animated characters associated with different environments or themes such as, for example, an ocean environment, a prehistoric environment and a fairy tale environment. The automated bowling scoring system or other display system such as a kiosk or point of sale (POS) terminal (hereinafter referred to as "system") is generally denoted as reference numeral 100. Any of the automated bowling scoring system or other display system such as a kiosk or POS terminal can be used to select a theme party in accordance with the invention.

In an automated bowling scoring system environment, the system 100 includes a pin detector 102 operatively connected to a processor 104. The pin detector 102 is configured to detect the position of the pins and provide such information to the processor 104. The processor 104 is connected to a memory module 106 and a scoring module 108. Based on the information received from the pin detector 102, the processor uses the scoring module 108 to calculate a score and display such score to a player on a display module 110, such as a video display or the like.

In embodiments, the memory module 106 of the system 100 includes a database and/or other conventional storage such as internal ROM or an external device, well known to those of skill in the art. The memory module 106, which can be implemented in any system type contemplated by the invention, includes animated characters related to a particular environment or theme. The particular environment or theme may be, for example, an ocean theme, a fairy tale theme or a prehistoric theme, to name but a few themes contemplated by the invention. The actions of the one or more animated characters can be related to bowling actions such as, for example, a strike, a spare, a gutter ball and/or a split.

In one illustrative example, the actions of the one or more animated characters can be displayed on a scoring display when a certain bowling action is detected by the automated bowling scoring system. For example, the processor 104 uses information in the memory module 106 in connection with the scoring module 108 to display the animated characters associated with the particular environment or theme on the display module 110 based on a particular bowling action. By way of an illustrative example, in an ocean theme, a shark may be shown when a player throws a gutter ball. Input module 112, such as a keyboard, touch-screen, or the like, may be used by a player to provide information to the processor 104, such as a player's name, handicap, selected theme or other information.

Further, the processor 104 may be connected to the Internet 114 to receive information from other systems. By way of example, a personal computer 120, also connected to the Internet, may be used to provide information to the system 100. This information, for example, can be the selection of a particular theme party and registration of such theme party. As should be understood by those of skill in the art, the computer 120 includes a processor 122, an input 124 and a display module 126.

In one non-limiting illustrative example, the personal computer 120 may provide a handicap to the processor 104. Based on the scoring, the handicap may be updated and then sent by the processor 104 to the computer 120. By way of another example, a user may send a photograph from the computer 120 to the processor 104 for incorporating into the automated bowling system. When the user bowls, the picture can be displayed on display module 110 to personalize the experience. Other functions to personalize the experience may also be performed by the computer, including allowing the user to select a certain theme for a party or other occasion. In embodiments, the selected theme is associated with the animated characters of the party kit; that is, the themed party supplies including balloons, centerpiece and character cut outs, etc. is matched to the environment with the embedded animation.

Exemplary Embodiments

Figure 2:
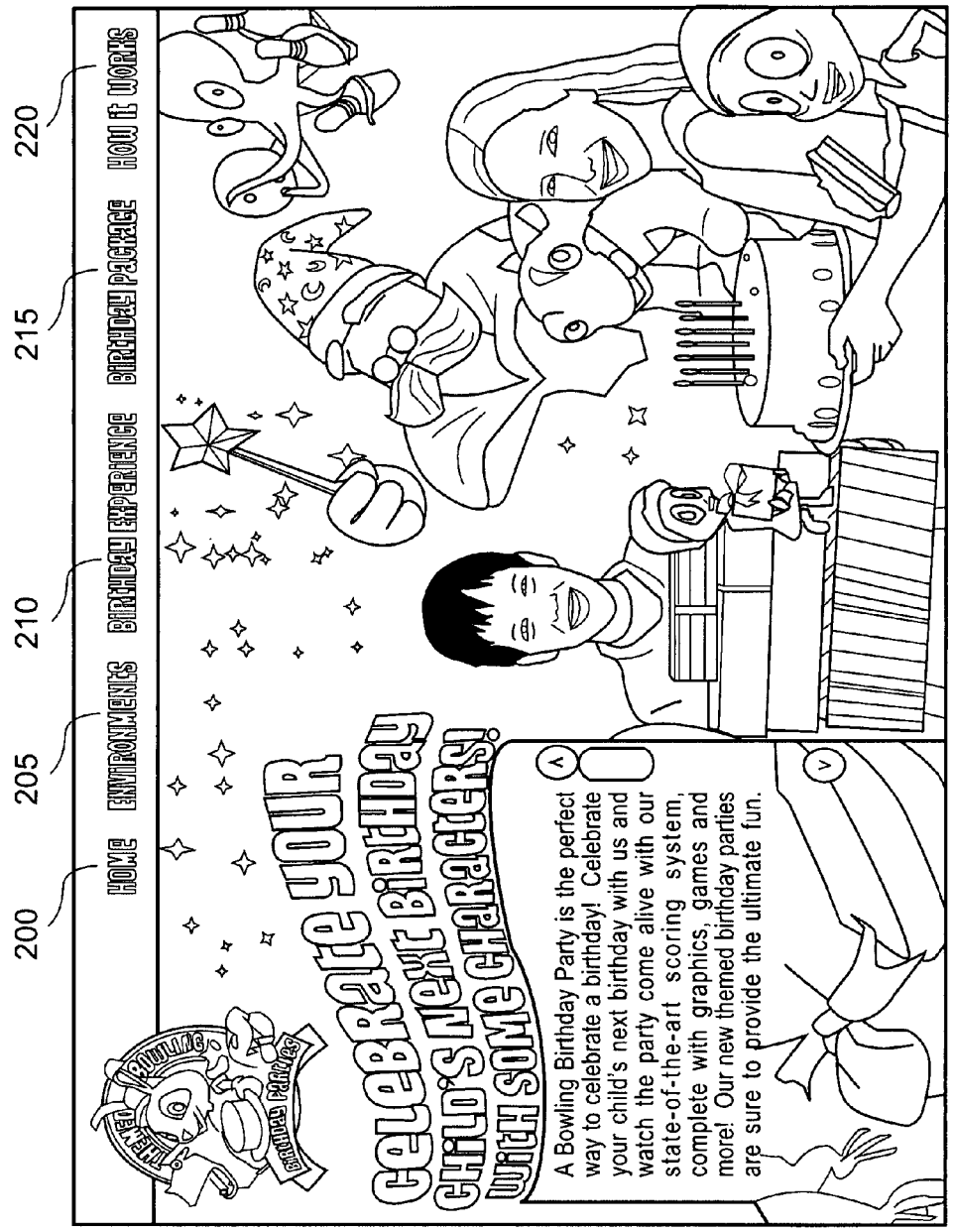
FIGS. 2-7 show various web pages or other user interface displays in accordance with the invention.

In addition to other functions, the personal computer 120 can access the World Wide Web to gain access to a plurality of websites associated with the party kit. By way of illustration, FIG. 2 shows a web page (or other user interface display) 200 for viewing the particulars associated with the party kit and to reserve a time and date for a theme party. More specifically, the display of FIG. 2 shows links to "home" 205, "environment" 210, "birthday experience" 215, "birthday package" 220 and "how it works" 225.

In embodiments,

The "home" link 205 brings the user to the website (or other user interface display) of FIG. 2.

Figure 3:
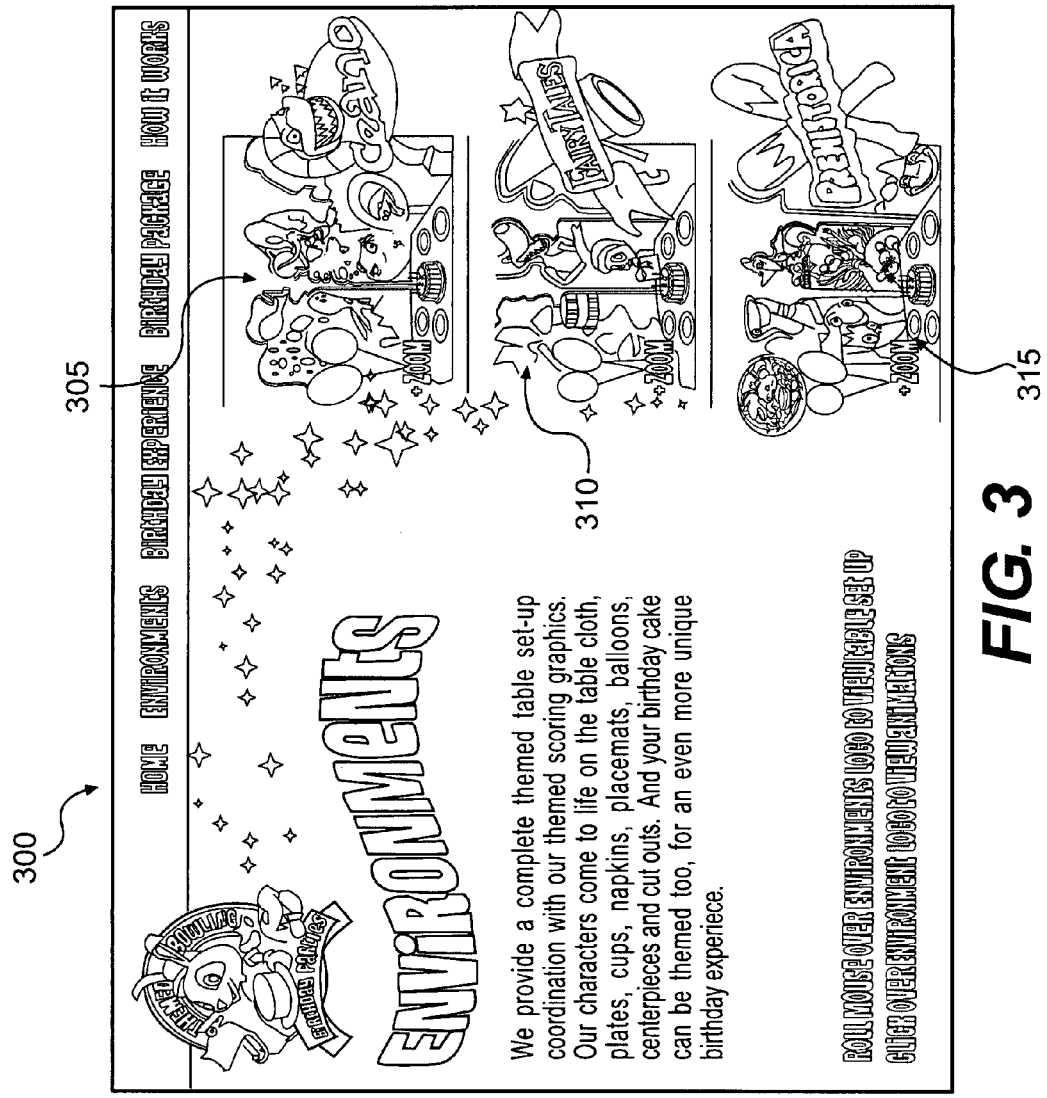

The "environment" link 210 brings the user to one or more WebPages (or other user interface displays) as shown in FIG. 3.

Figure 4:
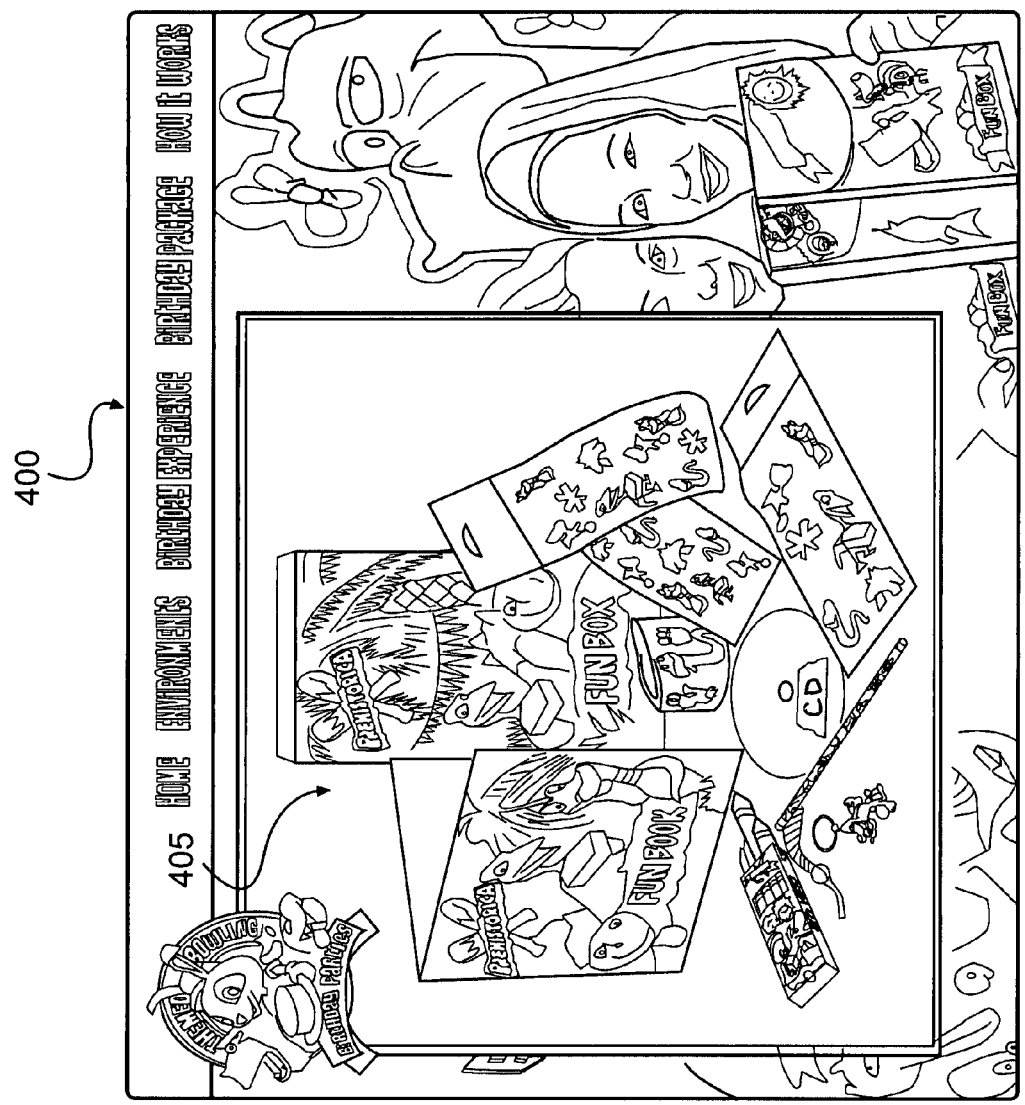

The "birthday experience" link 215 brings the user to one or more webpages (or other user interface displays) as shown in FIG. 4.

Figure 5:
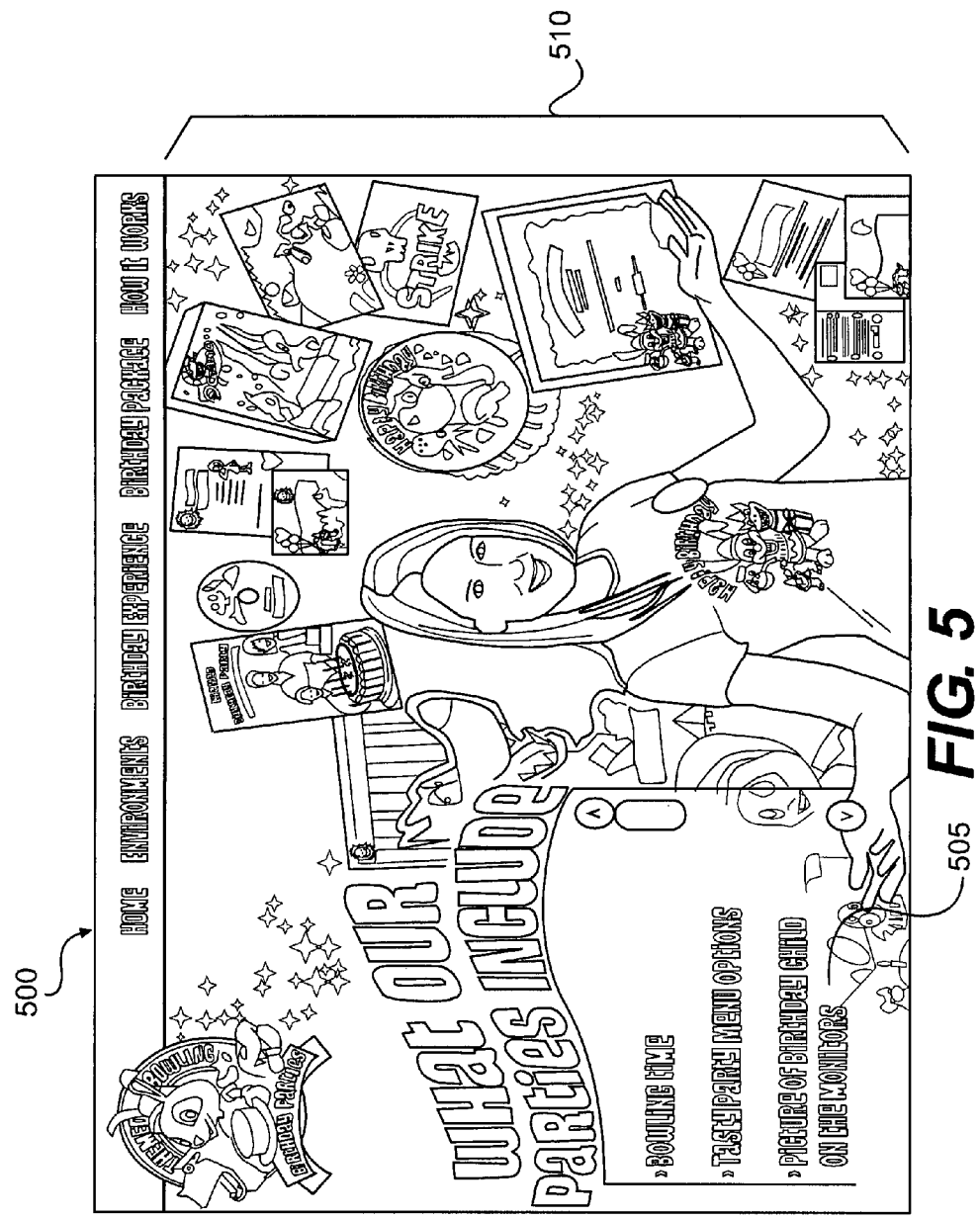

The "birthday package" link 220 brings the user to one or more webpages (or other user interface displays) as shown in FIG. 5.

Figure 6:
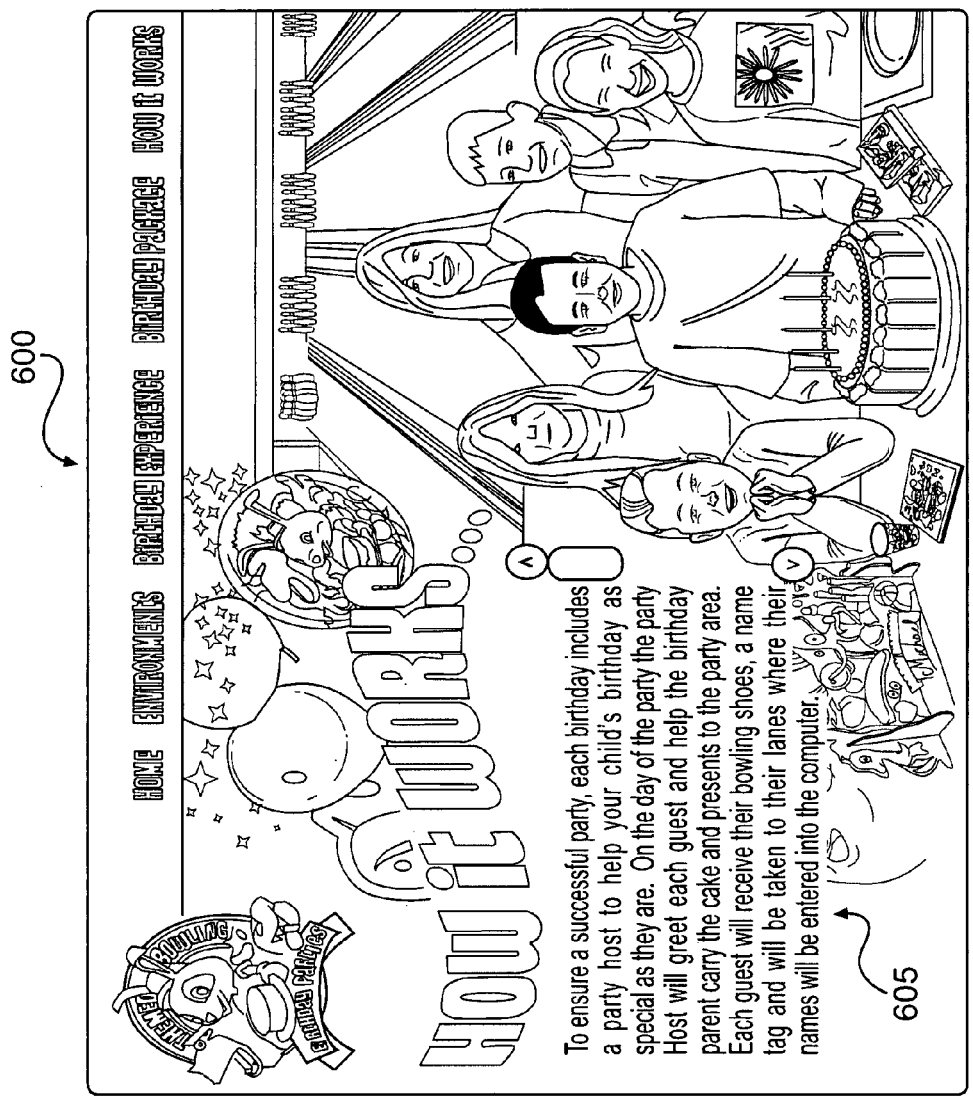

The "how it works" link 225 brings the user to one or more webpages (or other user interface displays) as shown in FIG. 6.

Figure 7:
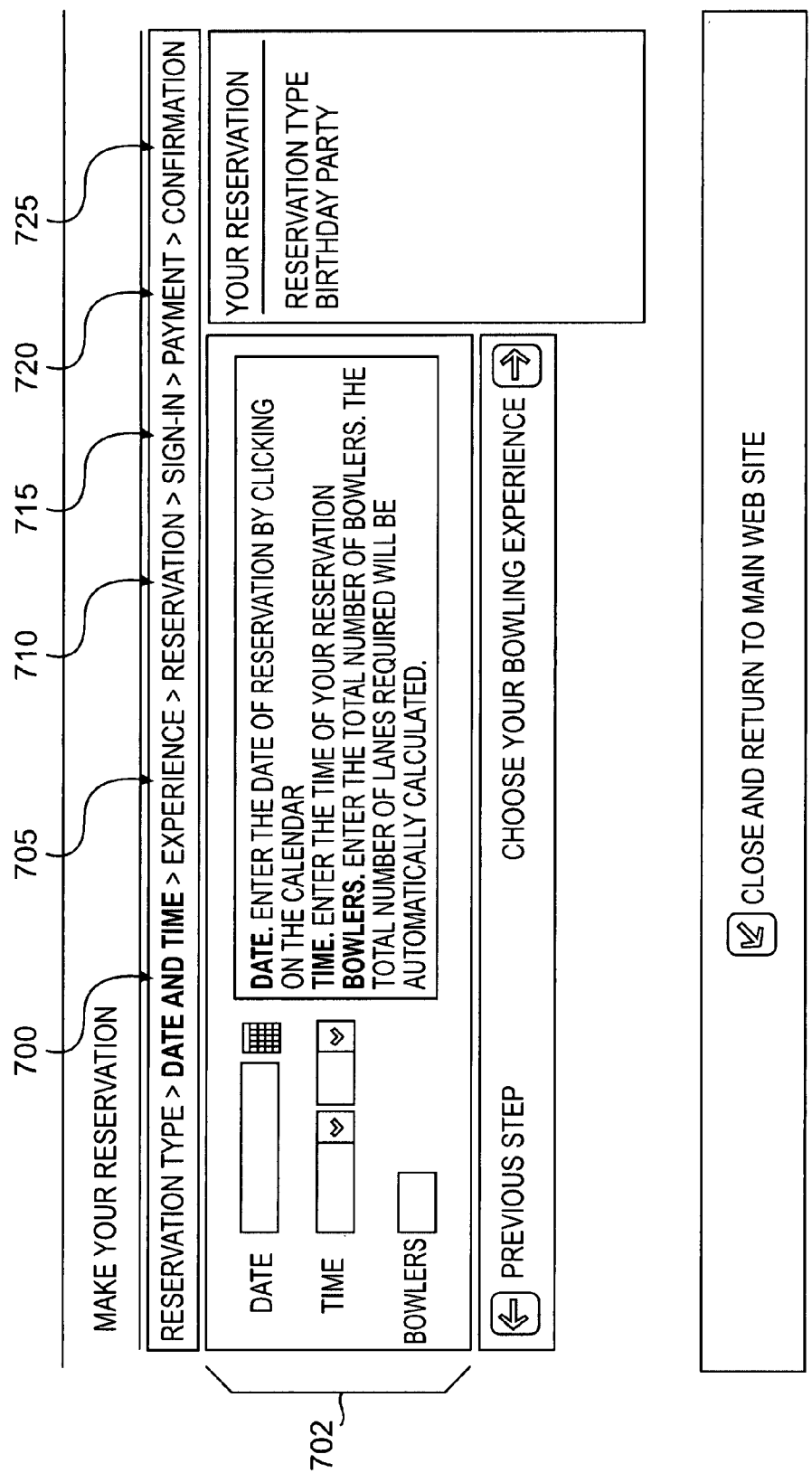

In addition, a registration page may be provided in accordance with the invention. The registration page is shown in FIG. 7.

More specifically, the "environment" (theme) page 300 of FIG. 3 shows demonstrations of the different party themes that are available in the bowling center. In FIG. 3, these demonstrations may include an ocean theme 305, fairy tale theme 310 and prehistoric theme 315. By activating (clicking) any of these themes 305, 310 or 320, an animation of these themes will be displayed for the user on the display. The animation may be, for example, associated with one or more of the bowling actions, which can be used in assisting the user in selecting a preferred theme for a party.

The "birthday experience" (party experience) page 400 of FIG. 4 shows the different party gifts that are associated with each party theme. In particular, FIG. 4 shows the party gifts associated with the fairy tale theme. The party gifts 405 include, for example, crayons, coloring books, wristbands, key chains, pencils and pens, stickers, tattoos and a compact disk with games, animations, etc. to a host of other gifts, all having characters associated with the selected animated characters displayed in the bowling environment.

The "birthday package" (party package) page 500 of FIG. 5 shows a list of items 505 included with the party kit. The "birthday package" page 500 also visually shows many of the items generally denoted at reference numeral 510. The items 505 include, for example, a parent survival guide, a table set-up, decorations and a gift box or party favors, all having characters associated with the characters associated with the selected animated characters displayed in the bowling environment. The items may also include bowling balls, shoes and other related bowling items. The parent survival guide includes items such as invitations, cake images and a compact disk or other media discussing tips on conducting a successful party, as well as links to the websites (or other user interface display) discussed with reference to FIGS. 2-7. The table set up includes items such as tablecloths, cups, napkins, plates and place mats. The decorations include items such as balloons, name tags, table centerpieces and stand-up cutouts. The gift box or party favors are discussed in detail above.

The "how it works" (explanation) page 600 of FIG. 6 explains the concepts behind the party kit using the animated characters of the bowling environment. The explanation includes safety tips, reservation information, bowling information and/or other useful facts.

FIG. 7 shows a registration page for reserving a party time and particular theme. In embodiments, the registration page 700 includes fields such as, date, time and number of bowlers, generally shown at 702. The registration page will automatically bring the user to further selected registration pages such as, for example, experience page 705, reservation details page 710, sign-in page 715, payment page 720 and confirmation page 725. In embodiments, the experience page 705 is configured to allow the user to enter information related to a particular theme. The reservation details page 710 is configured to allow the user to request additional items for the party. The sign-in page 715 is configured to allow the user to register the user's name and email address. The payment page 720 is configured to permit the user to enter payment information such as a credit card number and expiration date, and the confirmation page 725 provides the user with confirmation of the reservation.

Figure 8:
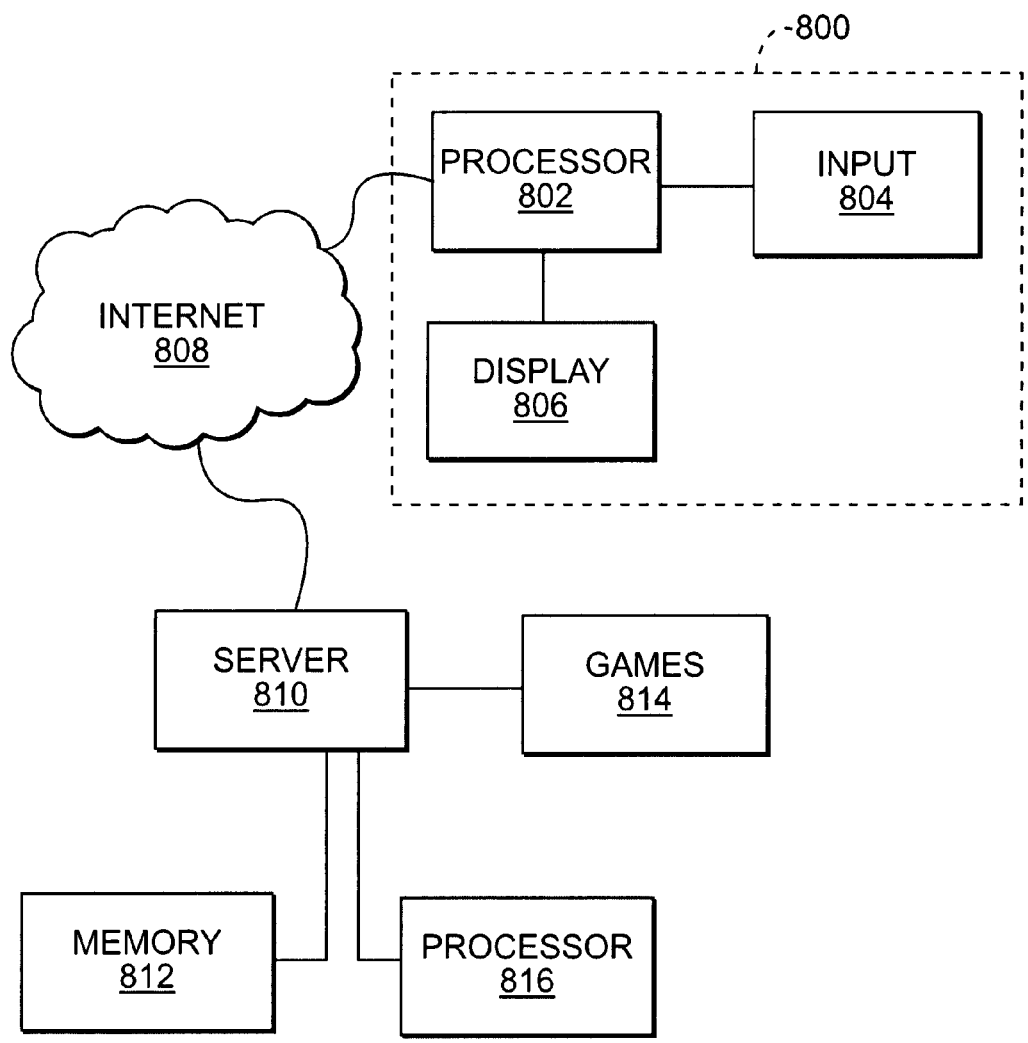
FIG. 8 is a schematic diagram illustrating a computer connected to the internet used with a party kit according to principles of the invention.

FIG. 8 is a schematic diagram illustrating a computer connected to the Internet used with a party kit according to principles of the invention. A computer 800 includes a processor 802, an input 804 and a display module 806. The computer 800 may be any known standard computer. A user loads the contents of the computer readable medium (e.g., CD ROM), included in the gift bag or supply bag, into the computer 800, and various features are displayed to the user on the display module 206. Using the input module 804, the user can interact with the features of the CD, as discussed herein.

The computer 200 can also be connected to a server 810 via the Internet 808 or other network. The computer readable medium (e.g., CD ROM) causes the computer 800 to access the server 810 via the Internet 808. The server 810 is connected to a memory module 812, a game module 814 and a processor 816. The computer 800 allows a user to interact with the server, such as by playing new games, receiving information on new events or accessing the pages of FIGS. 2-7.

Contents of Party Kits

As discussed above, the party kit may include procedure manuals, training manuals, an in-center marketing kit, theme party supplies and merchandising and gift bags. These features are shown, using one theme example, in FIGS. 9-11. These contents may include, for example, Themed party Invitations;
Parent Survival Guides;
Tableware;
Gift Box;
Standees;
Thank you cards;
A "One In A Million" Birthday Certificate;
Comment Evaluation Cards;
Themed Party Flip Guide (The flip book is an easy to use guide that can be used when showing a potential customer all of the elements included in the theme party program;
Party Host T-Shirt; and/or
Party Host Staff Guide (training manual).

Figure 9:
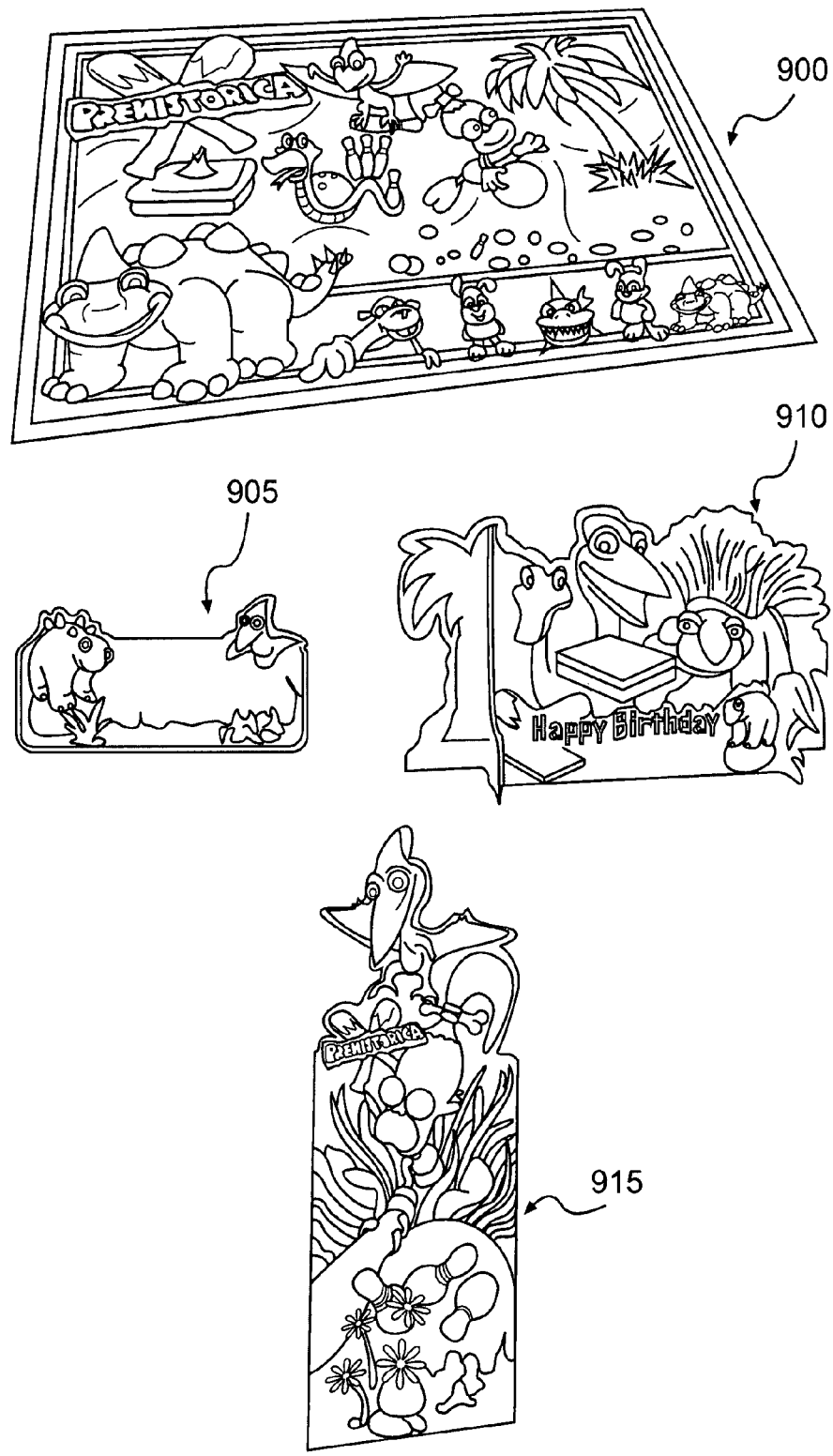
FIG. 9 shows various exemplary party decorations used for a theme party in accordance with the invention.

More specifically, FIG. 9 shows party decorations used in accordance with the invention. These decorations include, for example, a place mat 900, a nametag 905, a table centerpiece 910 and a stand-up cutout 915. In one preferred embodiment, a central element of the party theme environment is the party table, decorated with the themed party supplies, surrounded by the stand-up cutout and balloons. This environment setting is enhanced by the themed and personalized images displayed on the bowling system monitors.

It should be understood that other decorations could also be provided such as, for example, posters, stickers, etc., all having characters associated with the displayed animated characters in the bowling environment.

Figure 10:
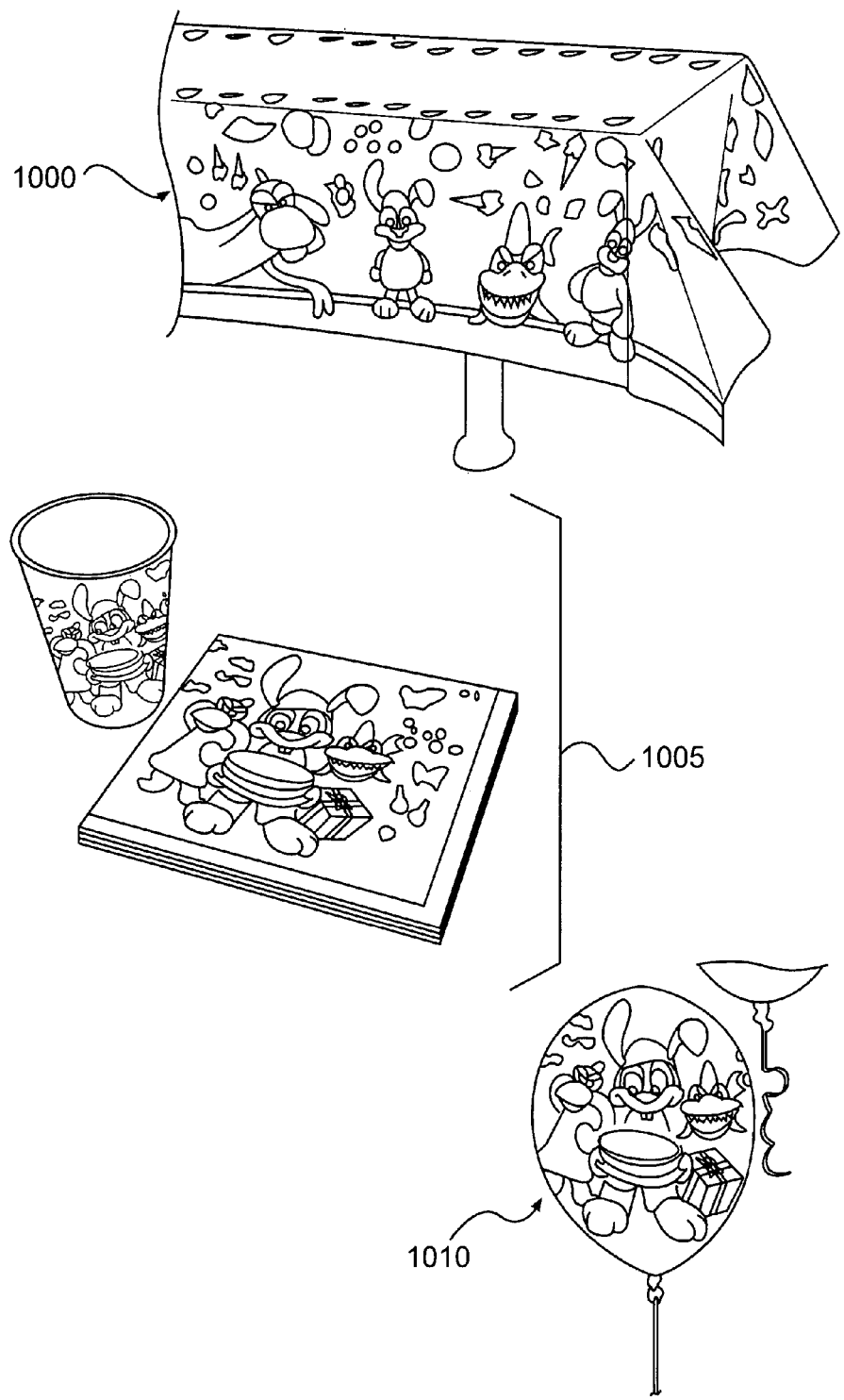
FIG. 10 shows various exemplary party supplies used for a theme party in accordance with the invention.

FIG. 10 shows various exemplary party supplies used for a theme party in accordance with the invention. The party supplies may include tablecloths 1000, napkins and cups 1005 (and other tableware) and balloons 1010. As discussed above, each of the party supplies have characters associated with the displayed animated characters in the bowling environment. It should be understood that other party supplies could also be provided, all having characters associated with the displayed animated characters in the bowling environment.

Figure 11:
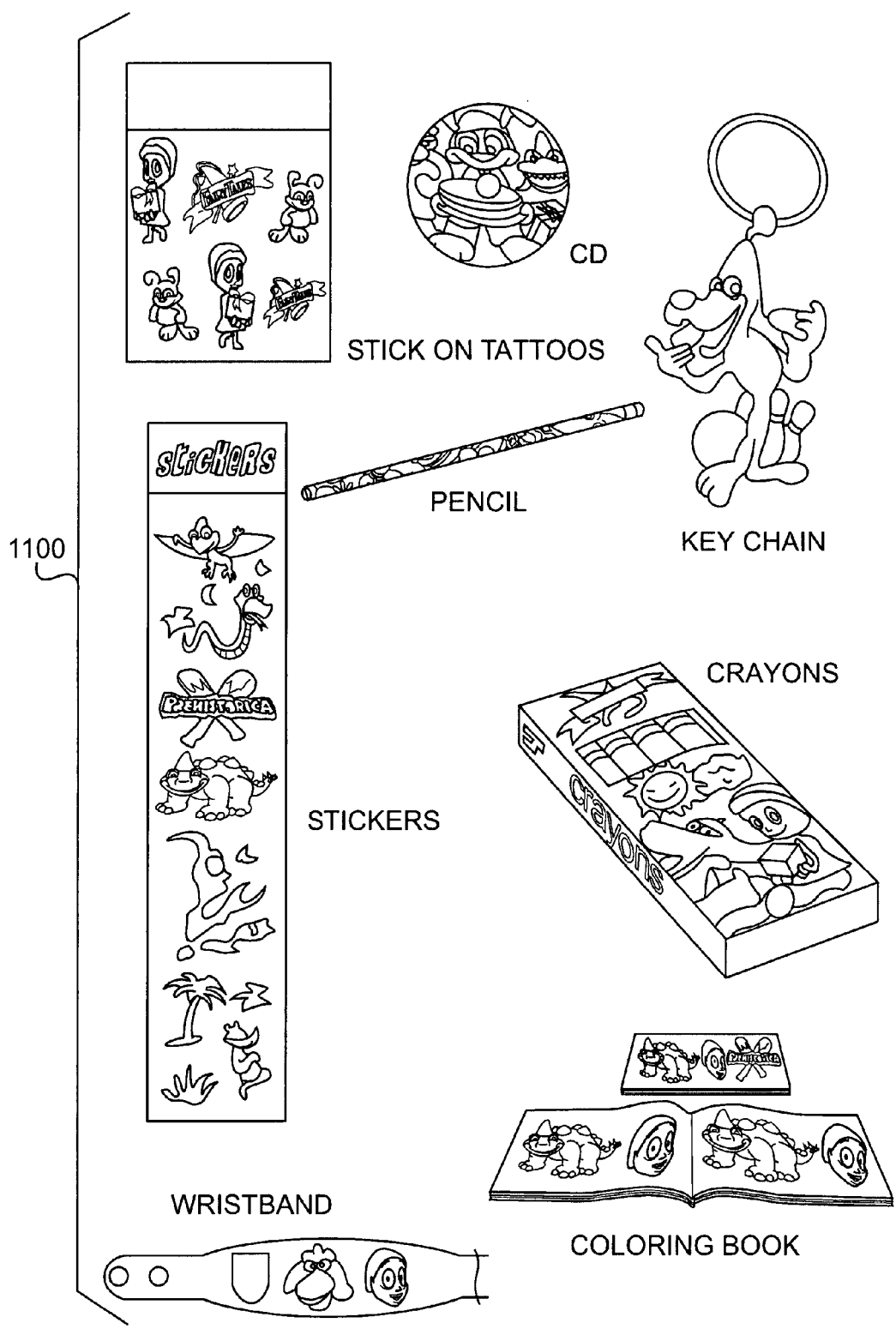
FIG. 11 shows various exemplary gifts used for a theme party in accordance with the invention.

FIG. 11 shows the various exemplary gifts provided in accordance with the invention. These gifts are generally denoted as reference numeral 1100. The gifts may include, for example, crayons, coloring books, wristbands, key chains, pencils and pens, stickers and stick on tattoos to a host of other gifts. In accordance with the invention all of the gifts have characters associated with the selected animated characters displayed in the bowling environment. The gifts, as well as the remaining or any items of the party kit, may be provided in a single box. The gifts may also be provided in a separate box, so that the party participant can easily transport the gifts after the party has completed.

The gift bags can also include a CD (or other form of media discussed herein) for each attendee. The CD contains a short animation clip that showcases the different environments (themes) with suggestions to come back and try all of the themes. In addition, the CD may have a number of games (bowling and learning), screen savers, screen buddies and a library of characters from all of the environments. According to an embodiment of the invention, the CD may also include an executable program to link the user's computer via the Internet to receive additional content, updates, and offers. For example, via this Internet link, a server associated with the bowling center may send a message to the user about upcoming bowling events associated with a party theme. The CD may be used with in-house systems such as kiosks and POS systems.

Figure 12:
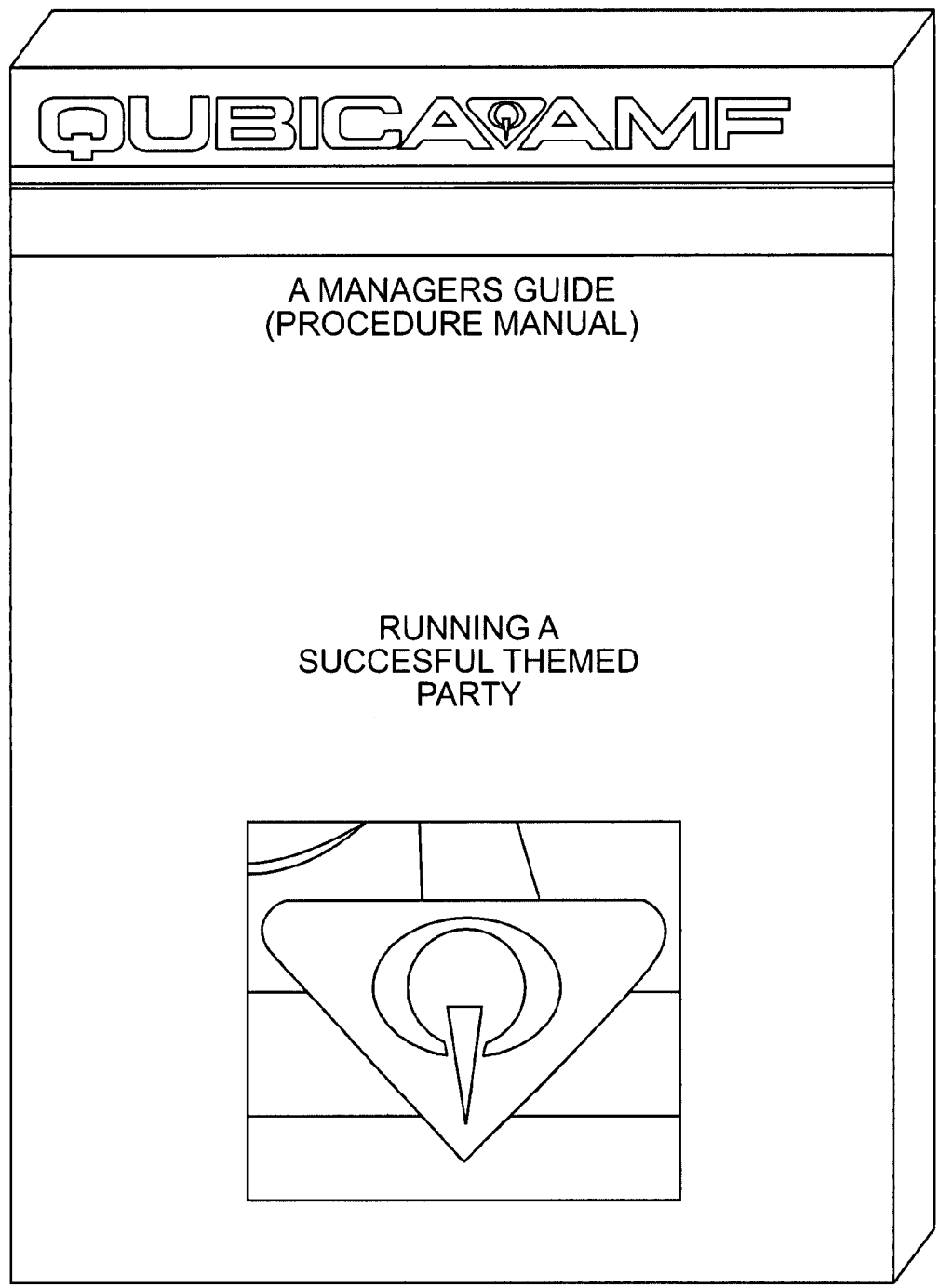
FIG. 12 shows a procedure manual in accordance with the invention.

FIG. 12 shows a procedure manual in accordance with the invention. The procedure manual of FIG. 12 is a guide to assist the proprietor, manager or other employee in running a theme party. The procedure manual includes the tools necessary to create the theme party including, for example, marketing materials hiring guidelines, etc. These materials would preferably be supplied to the proprietor or employees of the bowling center. The procedure manual may include an explanation on the use of the following items, amongst others, some of which form a part of the party kit:

Direct Mail Postcards;
Birthday Club Cards;

Posters;

Monitor Ads for uploading into the computer systems of the bowling environment for display on kiosks, video displays, and scoring displays;

Brochures/Flyers;

Buttons;

Bounceback/Informational Coupons;

POS Displays;

Promotional Standees;

E-Mail templates;

Website Marketing;

Merchandising materials;

Sample contracts; and/or

Reservation and confirmation processes.

The marketing materials provided with the procedure manual, in one implementation, may also include other advertisements related to the party kit in order to attract customers. In one embodiment, the marketing materials may include a computer readable medium (e.g., CD ROM) storing computer executable code for causing a computer to display advertisements related to theme parties in accordance with the invention. The computer readable medium would include demonstrations of the use of the characters in combination with the bowling experience. In embodiments, the computer readable medium may also include one or more links to the website(s) related to the party kit as discussed with reference to FIGS. 2-7. This allows the user to remotely view the different available party themes, e.g., prehistoric, ocean and fairy tale, as well as register on-line to reserve a date and party theme.

The merchandising material includes an up-sale merchandising set for the bowling center. The up-sale merchandising set may include themed items based on the animation characters in the automated bowling scoring system for parents or others to purchase. Moreover, these items, such as action figures, pens, back packs, shirts, bowling supplies, or other items, may be purchased at other times.

Figure 13:
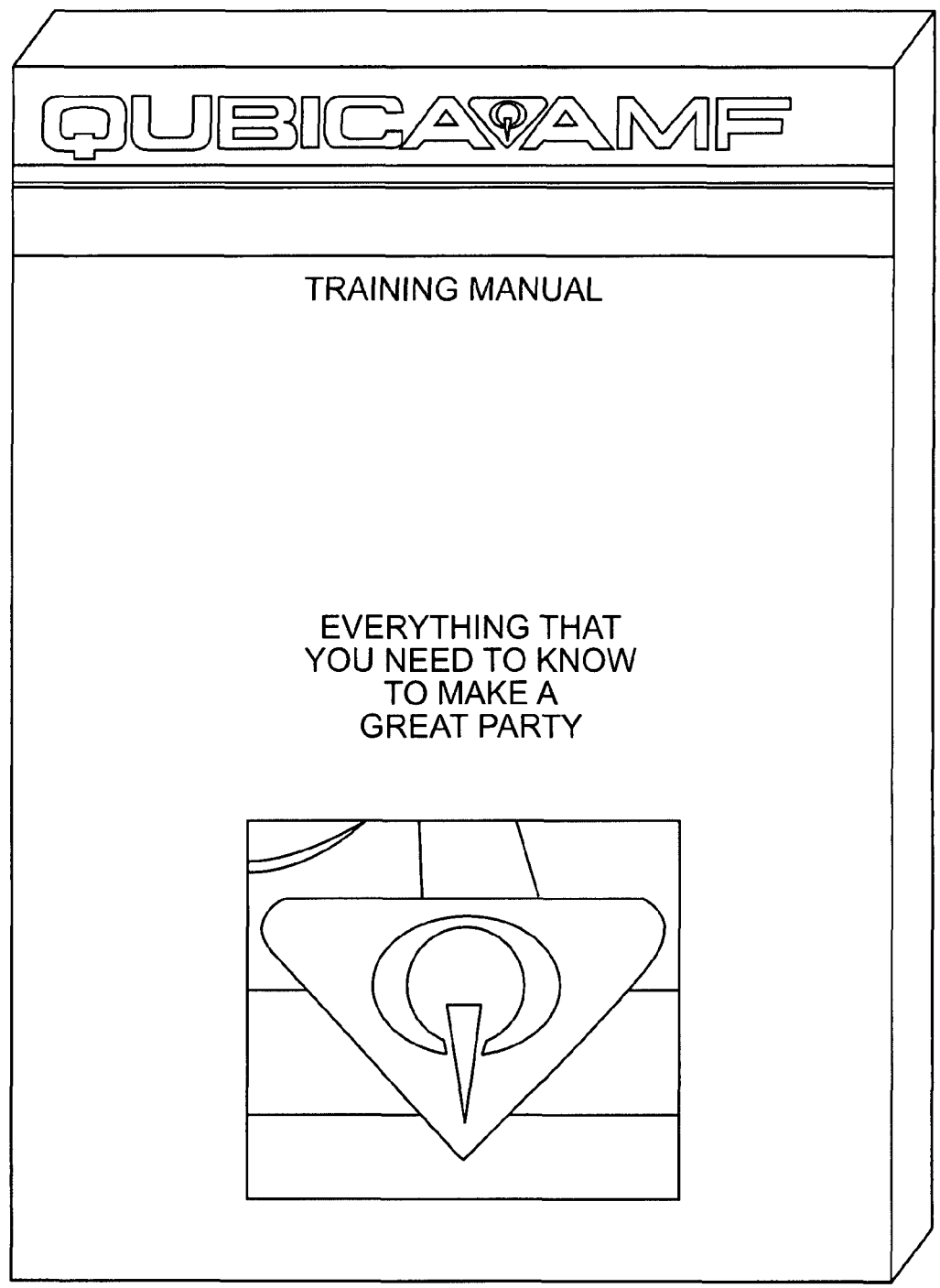
FIG. 13 shows a training manual in accordance with the invention.

FIG. 13 shows a training manual in accordance with the invention. The training manual includes instructions for training employees of the bowling center to effectively use the party kit. These instructions may include, for example, The process of booking a party;

Party confirmation calls;

Upselling before and during the party;

Meet and greet the parents/hosts;

Pre-Party set-up;

How to use the computer/scoring system;

Table Set-Up;

Food handling (if applicable);

Safety Rules;

Wrap Up/Sample Scripts; and/or

Clean Up.

The invention also includes a method of using the party kit. This method includes, for example, decorating a location of a bowling center used for a party with at least tableware and decorations each having one or more characters thereon which are displayed by an automated bowling scoring system when certain bowling actions occur. As should be appreciated by those of skill in the art, the method can use the tableware and decorations as described above. The method also includes providing gifts to party attendees, where each of the gifts have the one or more characters thereon which are to be displayed by an automated bowling scoring system when certain bowling actions occur.

As thus should be understood, the party kit takes advantage of animated characters that are used in the automated electronic bowling scoring software by bringing them into the physical realm vis a vis a set of theme party supplies, merchandising and gifts using those same characters. Also, by implementing the system and methods of the invention, both customers and bowling center owners may be provided with a unique entertainment experience that utilizes an automated bowling scoring system associated with the party kits. Bowling center owners can thus improve the entertainment experience for their customers and enable the owners to better compete with an ever-expanding set of party venues and options. Also, by providing the themed, integrated party will help bowling centers create new revenue streams, which, in turn, make electronic bowling scoring systems more competitive. The themed parties can also enhance customer loyalty and repeat visits to the bowling center by both the party host and the party guests.

Figure 14:
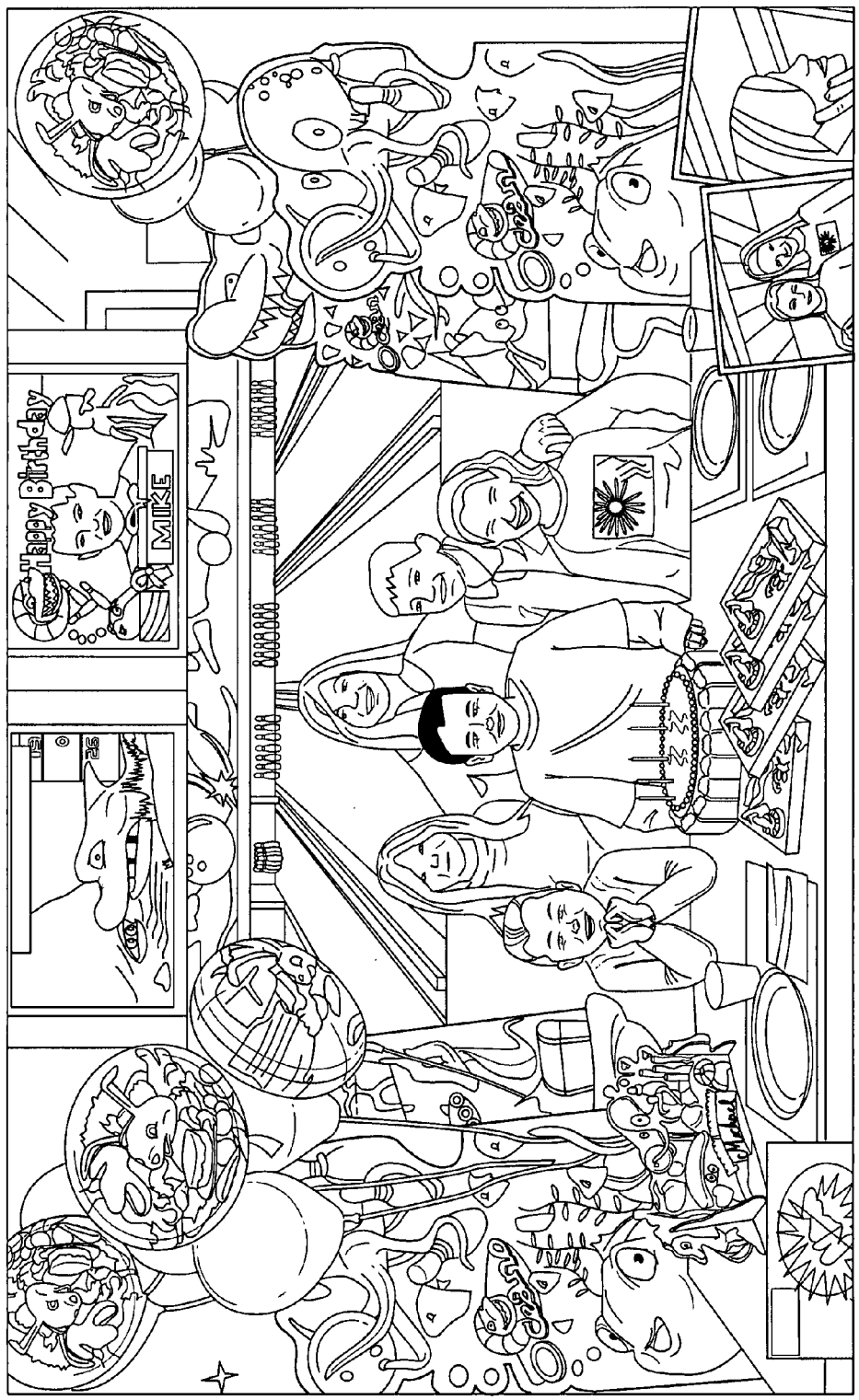
FIG. 14 shows a complete environment using the party kit according to principles of the invention.

FIG. 14 shows an environment using the party kit according to principles of the invention. In particular, FIG. 14 shows a party environment in a bowling center using, for example, an Oceano theme with the party cutouts, balloons, table supplies and table centerpiece, in addition to the use of virtual animated characters on the scoring monitors. The animated characters match the theme of the party kit supplies, as described herein. As shown, the party guests are completely immersed in the party theme environment. Party gifts and the related party items described herein are also shown, with the same theme.

Figure 15:
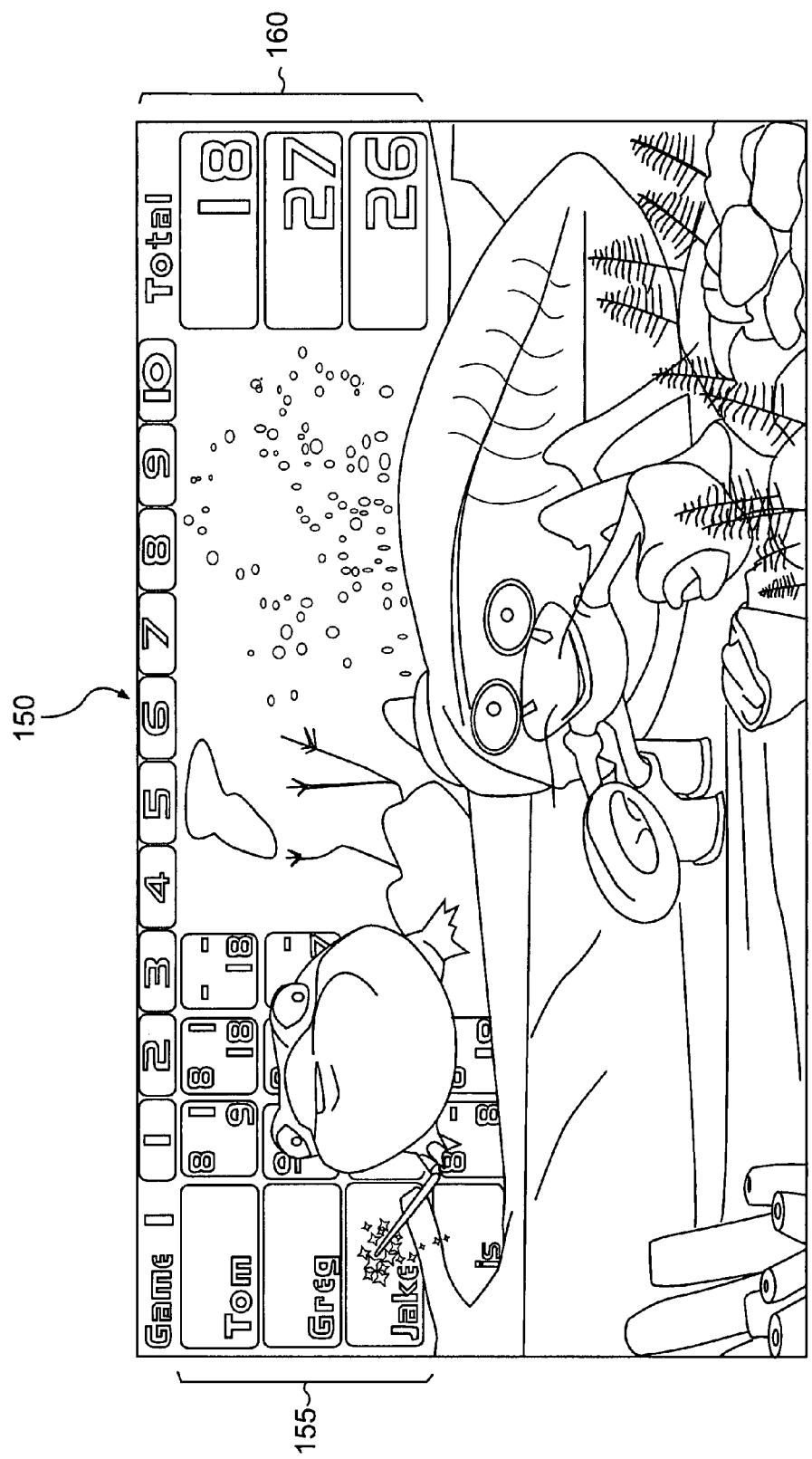
FIG. 15 is scoring grid implementing aspects of the invention.

FIG. 15 shows a scoring grid complete with animated characters in accordance with the invention. As shown, the scoring grid is generally shown as reference numeral 150. The scoring grid is an element of a preferred embodiment, together with the party supplies and the gifts of the present invention. In embodiments, the animated character is displayed as a background to the scoring grid. The scoring grid includes, for example, the names of the bowlers (participants) 155 and the scores 160 of the bowlers, for example. The scoring grid, in embodiments, can be displayed on scoring system lane monitors. As discussed herein, the characters can be animated, responding to the bowling actions.

While the invention has been described in terms of exemplary embodiments, those skilled in the art will recognize that the invention can be practiced with modifications in the spirit and scope of the appended claims. For example, while the embodiments described above have been directed to a birthday party, it may be implemented for other occasions, such as holidays (e.g., Halloween, St. Patrick's Day), graduations, or the like. These examples given above are merely illustrative and are not meant to be an exhaustive list of possible designs, embodiments, applications or modifications of the invention.

What is claimed is:

1. A party kit associated with a party theme, the party kit comprising:
    party gifts having at least one character thereon related to one or more animated characters associated with a theme, the one or more animated characters being displayed on one or more systems in a bowling center; and
    party supplies having the at least one character thereon which are related to the one or more animated characters displayed on the one or more systems in the bowling center.

2. The party kit of claim 1, wherein the one or more systems is an automated bowling scoring system.

3. The party kit of claim 2, wherein actions of the one or more animated characters are related to bowling actions.

4. The party kit of claim 1, wherein the party gifts include at least one of crayons, coloring book, wristband, key chain, pencil and storage medium.

5. The party kit of claim 4, wherein the storage medium is a CD ROM.

6. The party kit of claim 1, wherein the party supplies or party gifts include a storage medium storing at least one of: a short animation clip that showcases different themes having the one or more animated characters, games, screen savers, screen buddies and a library of characters from the different themes.

7. The party kit of claim 6, wherein the storage medium includes a link to content, updates, and offers associated with the different themes having the one or more animated characters.

8. The party kit of claim 6, wherein the storage medium includes a link to an interactive display configured to view the different themes and register for a theme party, each having the one or more animated characters associated therewith.

9. The party kit of claim 8, wherein the interactive display is a plurality of web pages including at least one of: a home page, a theme page, a party experience page, a party package page, an explanation page and a registration page.

10. The party kit of claim 9, wherein the theme page includes the different themes and animations thereof associated with the one or more animated characters displayed on the one or more system in the bowling center.

11. The party kit of claim 9, wherein the party experience page is configured to show the party gifts associated with the different themes.

12. The party kit of claim 9, wherein the party package page is configured to show a list of items included with the party kit.

13. The party kit of claim 12, wherein the list of items include at least one of: a parent survival guide; a table set-up; decorations; and a gift box holding the party gifts, all having the one or more characters associated with the animated characters displayed in the bowling center.

14. The party kit of claim 9, wherein the explanation page explains concepts behind the party kit using the one or more animated characters displayed in the bowling center.

15. The party kit of claim 9, wherein the registration page includes a name and email field for registering of users.

16. The party kit of claim 1, wherein the party supplies includes party decorations and tableware, each having the at least one character thereon.

17. The party kit of claim 1, further comprising marketing materials.

18. The party kit of claim 17, wherein the marketing materials include at least one of: promotional stand-ups; posters; monitor ads; brochures/flyers; bounceback/informational coupons; and point of sale (POS) displays, which have the at least one character thereon.

19. The party kit of claim 17, wherein the marketing materials include a computer readable medium storing computer executable code for causing a computer to display advertisements related to theme parties.

20. The party kit of claim 17, wherein the marketing materials include a computer readable medium storing computer executable code for causing a computer to display demonstrations of actions of the one or more animated characters in combination with the at least one character.

21. The party kit of claim 1, further comprising procedure materials related to the party kit, wherein the procedure materials include information related to at least one of:
  direct mail postcards;
  birthday club cards;
  posters;
  monitor ads for uploading into the one or more systems of the bowling center including at least one of kiosks, video displays, and scoring displays;
  brochures/flyers;
  buttons;
  bounceback/informational coupons;
  point of sale displays;
  promotional standees;
  e-mail templates;
  website marketing;
  merchandising materials;
  sample contracts; and
  reservation and confirmation processes.

22. The party kit of claim 1, further comprising an up-sale merchandising set including at least themed items based on the at least one animated character in an automated bowling scoring system of the bowling center.

23. The party kit of claim 1, further comprising training materials which include information related to at least one of:
  a process of booking a party;
  party confirmation calls;
  upselling before and during the party;
  meet and greet information;
  pre-party set-up;
  how to use computer/scoring systems in a bowling environment;
  table set-up;
  food handling (if applicable);
  safety rules;
  wrap up/sample scripts; and
  clean up.

24. The party kit of claim of claim 1, further comprising at least one of:
  themed party invitations;
  a parent survival guide;
  tableware;
  standees;
  thank you cards;
  comment evaluation cards;
  themed party guide; and
  party host shirt.

25. The party kit of claim 1, wherein the party kit is a system for providing entertainment, the system comprising a display for displaying the one or more animated characters associated with the theme as a background of a scoring grid.

26. A bowling system for a themed party having one or more animated characters, the bowling system comprising:
  an automated bowling scoring system in a bowling center, the automated bowling scoring system comprising:
    a pin detector;
    a processor for receiving information from the pin detector related to bowling actions; and
    a display for displaying the one or more animated characters based on signals from the processor; and
  a party kit comprising:
  marketing materials for marketing the party kit;
  party supplies related to the one or more animated characters displayed by the automated bowling scoring system;
  merchandising items related to the one or more animated characters displayed by the automated bowling scoring system; and
  gift bags or boxes including gifts for party attendees, each of the gifts having one or more character related to the one or more animated characters displayed by the automated bowling scoring system.

27. The bowling system of claim 26, wherein the party kit further comprises:

procedure materials related to contents of the party kit, to run themed parties and marketing of the party kit to attract customers; and training materials for training employees of the bowling center on use of the party kit and to run the themed parties.

28. The bowling system of claim 27, wherein the procedure materials include information related to at least one of:
- direct mail postcards;
- birthday club cards;
- posters;
- monitor ads for uploading into the one or more systems of the bowling center including at least one of kiosks, video displays, and scoring displays;
- brochures/flyers;
- buttons;
- bounceback/informational coupons;
- point of sale displays;
- promotional standees;
- e-mail templates;
- website marketing;
- merchandising materials;
- sample contracts; and
- reservation and confirmation processes.

29. The bowling system of claim 27, wherein the training materials include information related to at least one of:
- a process of booking a party;
- party confirmation calls;
- upselling before and during the party;
- meet and greet information;
- pre-party set-up;
- how to use computer/scoring systems in a bowling environment;
- table set-up;
- food handling (if applicable);
- safety rules;
- wrap up/sample scripts; and
- clean up.

30. The bowling system of claim 26, wherein the gift bags or boxes include a computer readable medium storing computer executable code for causing a computer to display characters associated with the one or more animated characters displayed by the automated bowling scoring system.

31. The bowling system of claim 26, wherein the gifts are at least one of crayons, coloring book, wristband, key chain, pencil and storage medium.

32. The bowling system of claim 26, wherein the party supplies or gift bags or boxes include a storage medium storing at least one of: a short animation clip that showcases different themes having the one or more animated characters, games, screen savers, screen buddies and a library of characters from the different themes used by the automated bowling scoring system.

33. The bowling system of claim 32, wherein the storage medium includes a link to content, updates, and offers associated with the different themes having the one or more animated characters.

34. The bowling system of claim 26, wherein the party supplies or gift bags or boxes include a storage medium storing a link to an interactive display configured to view different themes and register for a theme party.

35. The bowling system of claim 34, wherein the interactive display is a plurality of web pages including at least one of: a home page, a theme page, a party experience page, a party package page, an explanation page and a registration page.

36. The bowling system of claim 35, wherein the theme page includes different themes and animations thereof associated with the one or more animated characters displayed by the automated bowling scoring system.

37. The bowling system of claim 35, wherein the party experience page shows the gifts associated with different themes used by the automated bowling scoring system.

38. The bowling system of claim 35, wherein the party package page shows a list of items included with the party kit.

39. The bowling system of claim 38, wherein the list of items include at least one of: a parent survival guide; a table set-up; decorations; and a gift box holding the party gifts, all having one or more characters associated with the animated characters displayed by the automated bowling scoring system.

40. The bowling system of claim 35, wherein the explanation page explains concepts behind the party kit using the one or more animated characters displayed by the automated bowling scoring system.

41. The bowling system of claim 35, wherein the registration page includes a name and email field for registering of users.

42. The bowling system of claim 26, wherein the party supplies include party decorations and tableware, each having at least one character thereon associated with one or more animated characters.

43. The bowling system of claim 26, wherein the marketing materials include at least one of: promotional stand-ups; posters; monitor ads; brochures/flyers; bounceback/informational coupons; and POS displays, which use at least one character also used by the automated bowling scoring system.

44. The bowling system of claim of claim 26, further comprising at least one of:
- themed party invitations;
- a parent survival guide;
- tableware;
- standees;
- thank you cards;
- comment evaluation cards;
- themed party guide; and
- party host shirt,
- wherein each of the above items includes at least one character used by the automated bowling scoring system.

45. The bowling system of claim 26, wherein the merchandising items including at least themed items based on at least one animated character used by the automated bowling scoring system.

46. The bowling system of claim 26, wherein the party kit and the automated bowling scoring system is an entertainment system, display displaying the one or more animated characters as a background to a scoring grid.

47. A method of using a party kit having animated characters thereon, wherein the method comprises:
- decorating a location of a bowling center used for a party with at least tableware and decorations each having one or more characters thereon which are displayed by an automated bowling scoring system when certain bowling actions occur; and
- providing gifts to party attendees, each of the gifts having the one or more characters thereon which are to be displayed by an automated bowling scoring system when certain bowling actions occur.

48. The method of claim 47, further comprising selling merchandising materials having the one or more characters thereon which are to be displayed by an automated bowling scoring system when certain bowling actions occur.

* * * * *